US011289946B2

United States Patent
Abdelraheem et al.

(10) Patent No.: US 11,289,946 B2
(45) Date of Patent: Mar. 29, 2022

(54) METHOD AND SYSTEM OF UNIFORM WIRELESS POWER DISTRIBUTION WITHIN A CHAMBER

(71) Applicant: Purdue Research Foundation, West Lafayette, IN (US)

(72) Inventors: Ahmed Mahmoud Mahrous Abdelraheem, Cairo (EG); Michael Dimitri Sinanis, McLean, VA (US); Dimitrios Peroulis, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 169 days.

(21) Appl. No.: 16/843,749

(22) Filed: Apr. 8, 2020

(65) Prior Publication Data

US 2020/0321802 A1 Oct. 8, 2020

Related U.S. Application Data

(60) Provisional application No. 62/831,125, filed on Apr. 8, 2019.

(51) Int. Cl.
*H02J 50/00* (2016.01)
*H02J 50/40* (2016.01)
*A23L 3/44* (2006.01)

(52) U.S. Cl.
CPC ............ *H02J 50/001* (2020.01); *H02J 50/40* (2016.02); *A23L 3/44* (2013.01); *A23V 2002/00* (2013.01)

(58) Field of Classification Search
CPC ......... H02J 50/001; H02J 50/005; A23L 3/00; A23V 2002/00; H05B 6/00
See application file for complete search history.

(56) References Cited

U.S. PATENT DOCUMENTS 5,361,681 A * 11/1994 Hedstrom ............ H05B 6/6438
99/331
5,389,764 A * 2/1995 Nishii ...................... F24C 7/08
219/506

(Continued)

OTHER PUBLICATIONS

L. R. Arnaut, "Operation of Electromagnetic Reverberation Chambers With Wave Diffractors at Relatively Low Frequencies," 2001, IEEE Trans. Electromagn. Compat., vol. 43, No. 4, pp. 637-653.

(Continued)

*Primary Examiner* — Hal Kaplan
*Assistant Examiner* — Joseph N Inge
(74) *Attorney, Agent, or Firm* — Piroozi-IP, LLC (57) ABSTRACT

A method of uniform wireless power distribution within a chamber is disclosed which includes measuring dimensional characteristics of a chamber, having a transmitter and a plurality of power harvesters, creating a statistical electromagnetic environment, evaluating statistical properties of the statistical electromagnetic environment, setting a new criterion for acceptable statistical properties of the statistical electromagnetic environment, measuring a lowest usable frequency of the chamber below which the statistical properties of the statistical electromagnetic environment are not acceptable according to a predetermined criterion, determining an efficiency profile of the plurality of power harvesters versus frequency at frequencies higher than the lowest usable frequency, selecting an operating frequency that maximizes efficiencies of the plurality of power harvesters, measuring a collective efficiency of the chamber, and returning to setting a new criterion if the measured collective efficiency is below a predetermined efficiency threshold.

17 Claims, 7 Drawing Sheets

(56) References Cited

U.S. PATENT DOCUMENTS

| | | | | |
|---|---|---|---|---|
| 5,672,370 | A | | 9/1997 | Durance et al. |
| 5,972,397 | A | | 10/1999 | Durance et al. |
| 6,104,291 | A | * | 8/2000 | Beauvillier .......... G06K 7/0095 340/572.1 |
| 9,210,740 | B2 | * | 12/2015 | Libman .................... H05B 6/00 |
| 9,267,734 | B2 | | 2/2016 | Durance et al. |
| 9,301,344 | B2 | * | 3/2016 | Ibragimov ........... H05B 6/6467 |
| 9,351,347 | B2 | * | 5/2016 | Torres ..................... H05B 6/72 |
| 9,414,444 | B2 | * | 8/2016 | Libman ............... H05B 6/6455 |
| 2002/0160717 | A1 | * | 10/2002 | Persson ............. G01R 29/0821 455/67.11 |
| 2004/0134904 | A1 | * | 7/2004 | Clemen, Jr. ............. H05B 6/72 219/709 |
| 2007/0137633 | A1 | * | 6/2007 | McFadden ........... H05B 6/6473 126/21 A |
| 2007/0194011 | A1 | * | 8/2007 | McFadden ............. H05B 6/708 219/681 |
| 2009/0321428 | A1 | * | 12/2009 | Hyde ................... H05B 6/6455 219/702 |
| 2010/0187224 | A1 | * | 7/2010 | Hyde ................... H05B 6/6455 219/720 |
| 2011/0155725 | A1 | * | 6/2011 | Valenzuela Valdes ...................... G01R 29/0871 219/756 |
| 2012/0030963 | A1 | | 2/2012 | Durance et al. |
| 2012/0103975 | A1 | * | 5/2012 | Okajima ................ H05B 6/705 219/660 |
| 2012/0168645 | A1 | * | 7/2012 | Atzmony ................ H02J 50/12 250/492.1 |
| 2013/0080098 | A1 | * | 3/2013 | Hadad .................... H05B 6/705 702/66 |
| 2015/0070029 | A1 | * | 3/2015 | Libman ................. G01N 22/00 324/637 |
| 2016/0052050 | A1 | * | 2/2016 | Pavlov .................... F27D 27/00 164/468 |
| 2016/0164301 | A1 | * | 6/2016 | Sample .................. H02J 50/20 307/104 |
| 2016/0249416 | A1 | * | 8/2016 | Elboim .................... H05B 6/68 |
| 2016/0273970 | A1 | * | 9/2016 | Alon .................... G01K 11/006 |
| 2016/0323940 | A1 | * | 11/2016 | Guatta .................. H05B 6/705 |
| 2016/0330803 | A1 | * | 11/2016 | Guatta ............... G01R 29/0892 |
| 2017/0290104 | A1 | * | 10/2017 | Bullo ..................... H05B 6/687 |
| 2019/0274196 | A1 | * | 9/2019 | Guatta ..................... H05B 6/52 |
| 2019/0319675 | A1 | * | 10/2019 | Dvorsky ............... G06F 1/3206 |
| 2019/0320506 | A1 | * | 10/2019 | Guatta ................... H05B 6/705 |

OTHER PUBLICATIONS

J. M. Ladbury, G. H. Koepke, and D. G. Camell, "Evaluation of the NASA Langley Research Center Mode-Stirred Chamber Facility," 1999, Tech. Note (NIST TN)-1508, vol. 1508, No. Tech. Note (NIST TN)-1508.

D. A. Hill, "Plane Wave Integral Representation for Fields in Reverberation Chambers," 1998, IEEE Trans. Electromagn. Compat., vol. 40, No. 3, pp. 209-217.

C. L. Holloway, D. A. Hill, J. Ladbury, G. Koepke, and R. Garzia, "Shielding Effectiveness Measurements of Materials Using Nested Reverberation Chambers," May 2003, IEEE Trans. Electromagn. Compat., vol. 45, No. 2, pp. 350-356.

J. C. West, R. Bakore, and C. F. Bunting, "Statistics of the Current Induced Within a Partially Shielded Enclosure in a Reverberation Chamber," Dec. 2017, IEEE Trans. Electromagn. Compat., vol. 59, No. 6, pp. 2014-2022.

J. C. West, J. N. Dixon, N. Nourshamsi, D. K. Das, and C. F. Bunting, "Best Practices in Measuring the Quality Factor of a Reverberation Chamber," Jun. 2018, IEEE Trans. Electromagn. Compat., vol. 60, No. 3, pp. 564-571.

D. A. Hill, "Electronic Mode Stirring for Reverberation Chambers," 1994, IEEE Trans. Electromagn. Compat., vol. 36, No. 4, pp. 294-299.

C. L. Holloway, D. A. Hill, J. M. Ladbury, and G. Koepke, "Requirements for an Effective Reverberation Chamber: Unloaded or Loaded," Feb. 2006, IEEE Trans. Electromagn. Compat., vol. 48, No. 1, pp. 187-194.

H. Leaderman, "Eigenmodes and Composite Quality Factor of a Reverberating Chamber," 1957.

T. Matsuoka, S. Fujita, and S. Mae, "Effect of Temperature on Dielectric Properties of Ice in the Range 5-39 GHZ," 1996, J. AppL Phys., vol. 80, No. 10, pp. 5884 5890.

S. M. Patel, T. Doen, and M. J. Pikal, "Determination of End Point of Primary Drying in Freeze-Drying Process Control," Mar. 2010, AAPS PharmSciTech, vol. 11, No. 1, pp. 73-84.

* cited by examiner

METHOD AND SYSTEM OF UNIFORM WIRELESS POWER DISTRIBUTION WITHIN A CHAMBER

CROSS-REFERENCE TO RELATED APPLICATIONS

The present patent application is related and claims the priority benefit to U.S. Provisional Patent Application Ser. No. 62/831,125 filed Apr. 8, 2019; and is related to U.S. Provisional Patent Application Ser. No. 62/831,159 filed Apr. 8, 2019, and to U.S. Provisional Patent Application Ser. No. 62/851,129 filed May 22, 2019, the contents of each of which are hereby incorporated by reference in its entirety into the present disclosure.

STATEMENT REGARDING GOVERNMENT FUNDING

This invention was not made with government funding.

TECHNICAL FIELD

The present disclosure generally relates to wireless power transmission, and in particular, to uniform wireless power transmission within a chamber.

BACKGROUND

This section introduces aspects that may help facilitate a better understanding of the disclosure. Accordingly, these statements are to be read in this light and are not to be understood as admissions about what is or is not prior art.

Uniform wireless power transmission within a chamber is of high importance in many applications. One such application is liophilization which is generally known as freeze drying. This process is widely used in both the pharmaceutical and food industries. This process involves controllably removing water content from a frozen solution. Liophilization allows drugs or food products to be kept in a stable form for easier and longer storage. When the drug is required to be used, it can be easily rehydrated by adding water. Anti-cancer and anti-allergic drugs, attenuated vaccines, antibiotics, and probiotics are examples of such drugs that utilize lyophilization.

The typical operation of lyophilization includes loading lyophilizate (the drug solution being lyophilized) into vials. These vials are subsequently loaded into a freeze-drying chamber where they undergo the lyophilization.

The process of freeze drying can be divided into three main steps: freezing, primary drying and secondary drying, while constantly keeping the maximum product temperature below a critical temperature to avoid ruining the product. Therefore, continuous monitoring of the lyophilizate's temperature during the process is necessary for a successful and efficient lyophilization.

While monitoring of individual vials is important, techniques in the current state of the art only allow monitoring the chamber ambient temperature. One of the challenges for developing wireless sensors to monitor the vials' temperatures within the chamber is the need for wireless power transfer system to power these sensors in an electromagnetically difficult environment.

As a result, there is an unmet need for a wireless power transmission (WPT) system and method that can transfer power to sensors with a uniform distribution at a large number of positions within a chamber.

SUMMARY

A method of uniform wireless power distribution within a chamber is disclosed. The method includes measuring dimensional characteristics of a chamber, having a transmitter and a plurality of power harvesters. The method further includes creating a statistical electromagnetic environment by stirring electromagnetic waves generated by an electromagnetic source inside the chamber. In addition, the method includes evaluating statistical properties of the statistical electromagnetic environment, and setting a new criterion for acceptable statistical properties of the statistical electromagnetic environment. The method also includes measuring a lowest usable frequency of the chamber below which the statistical properties of the statistical electromagnetic environment are not acceptable according to a predetermined criterion, and determining an efficiency profile of the plurality of power harvesters versus frequency at frequencies higher than the lowest usable frequency. Additionally, the method includes selecting an operating frequency that maximizes efficiencies of the plurality of power harvesters, and measuring a collective efficiency of the chamber. In case the measured collective efficiency is below a predetermined efficiency threshold, the method includes returning to setting a new criterion.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel wireless power transmission (WPT) system and method that can transfer power to sensors with a uniform distribution in the space within a chamber is disclosed. The method includes utilizing statistical electromagnetism methodology in determining a frequency from an alternating power source that can generate the desired uniform power distribution at these positions.

Figure 1:
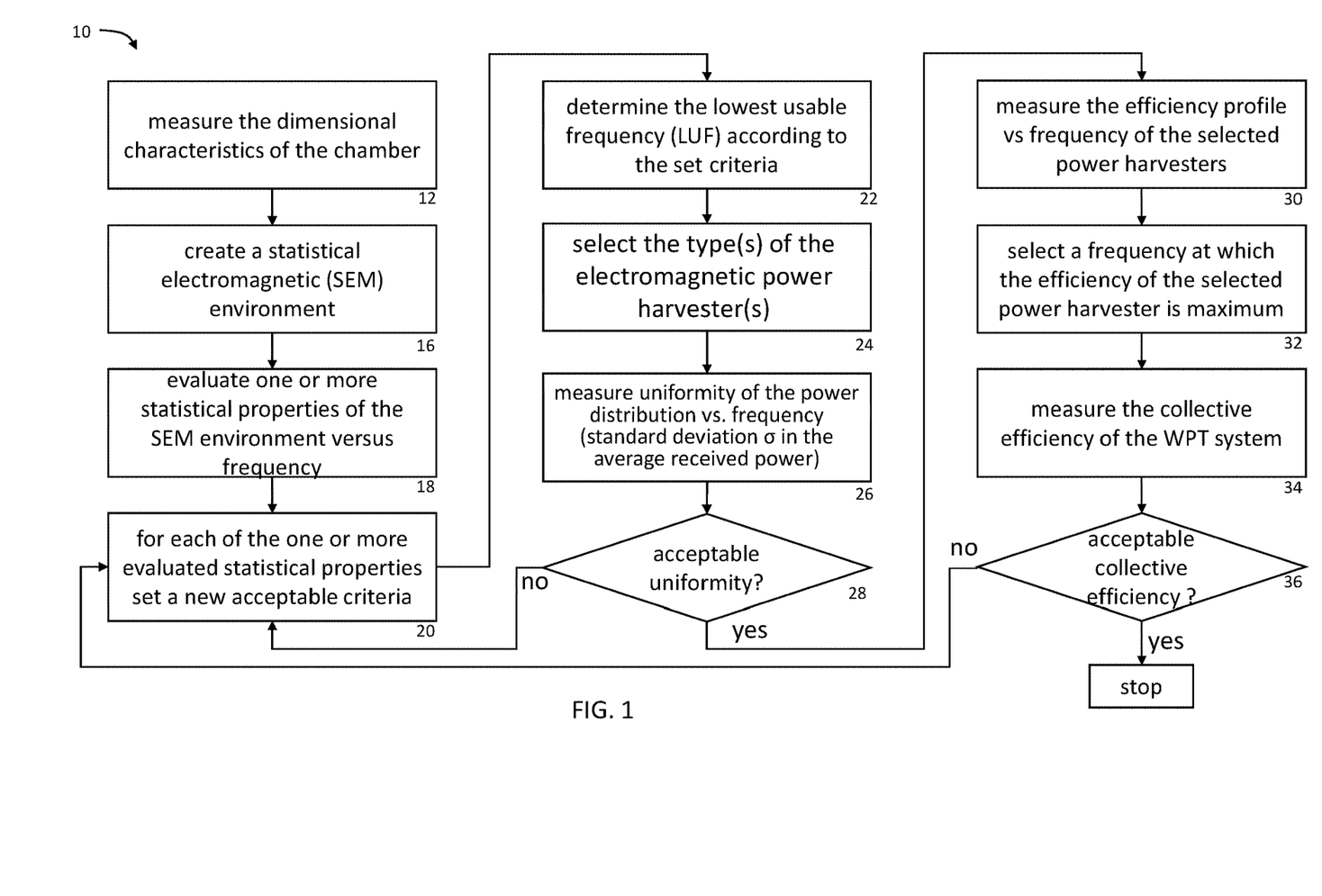
FIG. 1 is a flowchart describing steps of a method of uniform wireless power distribution within a chamber, according to the present disclosure.
Figure 2A:
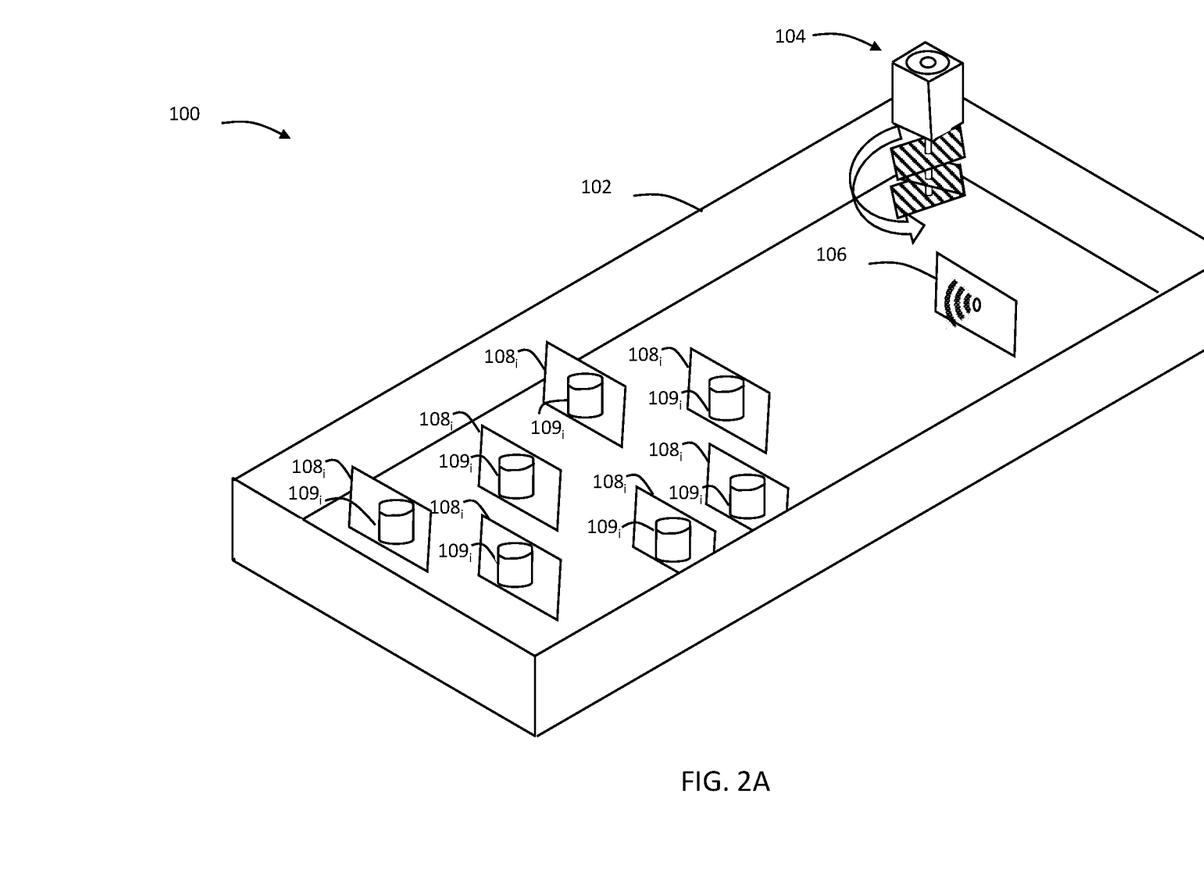
FIG. 2A is an exemplary schematic of the chamber including a motor assembly in which the method of FIG. 1 is performed.

Referring to FIG. 1, a flowchart describing the steps of a method 10 according to the present disclosure is shown. The method begins by measuring the dimensional characteristics of a chamber in which uniform power distribution is desired, as shown by block 12. An example of such chamber is shown in FIG. 2A, as identified by reference numeral 102. This step includes determining volume, surface area, largest dimension, and smallest dimension of the chamber. As shown in FIG. 2A, the chamber contains a transmitting antenna 106 that is coupled to an electromagnetic power source, a number of receiving antennas $108_i$ each one is the first stage of a wireless power harvester device $109_i$ that is intended to harvest the uniformly distributed power inside the chamber 102, and a mechanical stirrer 104 of which the functionality will be made clear, below. The next step is to create a statistical (random) electromagnetic environment, as provided by block 16 in FIG. 1. In the presented example, this is achieved by continuously rotating the mechanical stirrer 104 inside the chamber which continuously changes the boundary conditions for the electromagnetic waves resonating inside the chamber 102. This in turn results in a continuously changing electromagnetic fields structures inside the chamber which promotes a random electromagnetic environment. The next step is to evaluate the statistical properties of the created statistical (random) electromagnetic environment versus frequency as provided by the block 18. The objective in this step is to measure from this evaluation how close is the created environment to an ideal random performance under which the properties of the theory of statistical electromagnetics apply. One of these properties that is essential to the presented application is the independence of the received power within the chamber on the position, in other words the uniformity of the received power. Since it is quite difficult, if not impossible, to create an ideally random electromagnetic environment, the next step is setting thresholds for the statistical properties that results in a specified (by a specified standard deviation from the mean) field uniformity, as indicated by block 20 of FIG. 1. The next step is to determine the lowest usable frequency which is the minimum frequency below which the statistical properties are below the set thresholds, as indicated by block 22. The next step is to select the type(s) of the wireless power harvesters depending on the application, as indicated by block 24. It is known that the efficiency of the power harvester depends on the amount of input wireless power available at the location of the harvester. It is also known that this efficiency peaks at some input wireless power and decays if this power increases or decreases. Therefore, it is preferable to utilize identical power harvesters or different power harvesters with similar efficiency profiles. Consequently, maintaining a uniform power distribution at all harvesters' locations results in achieving the maximum collective efficiency from these harvesters. The next step is to measure the achieved uniformity in power distribution versus frequency in terms of the associated standard deviation, as shown in block 26. The next step is to check whether the uniformity is acceptable, as provided in block 28. If not, the criteria for acceptable statistical properties should be updated such that a more ideal random environment is obtained and, hence, a more uniform power distribution is achieved by returning to block 20. If yes, the method 10 proceeds to the next step which is to measure the efficiency profile of the harvesters versus frequency for all frequencies that is higher than the minimum frequency at which the uniformity evaluated in the previous step is acceptable, as provided by block 30. The next step is to select the frequency at which the efficiency profiles is maximum, as provide by block 32. The next step is to measure the collective efficiency of the wireless power transmission system which is the ratio between the total harvested power from all harvesters and the input power at the transmitting antenna, as provided by block 34. Finally, if better collective efficiency is required, the criteria for acceptable statistical properties should be updated accordingly and the entire procedure afterwards is repeated by returning to block 20. If acceptable, then the method 10 is completed.

Figure 2B:
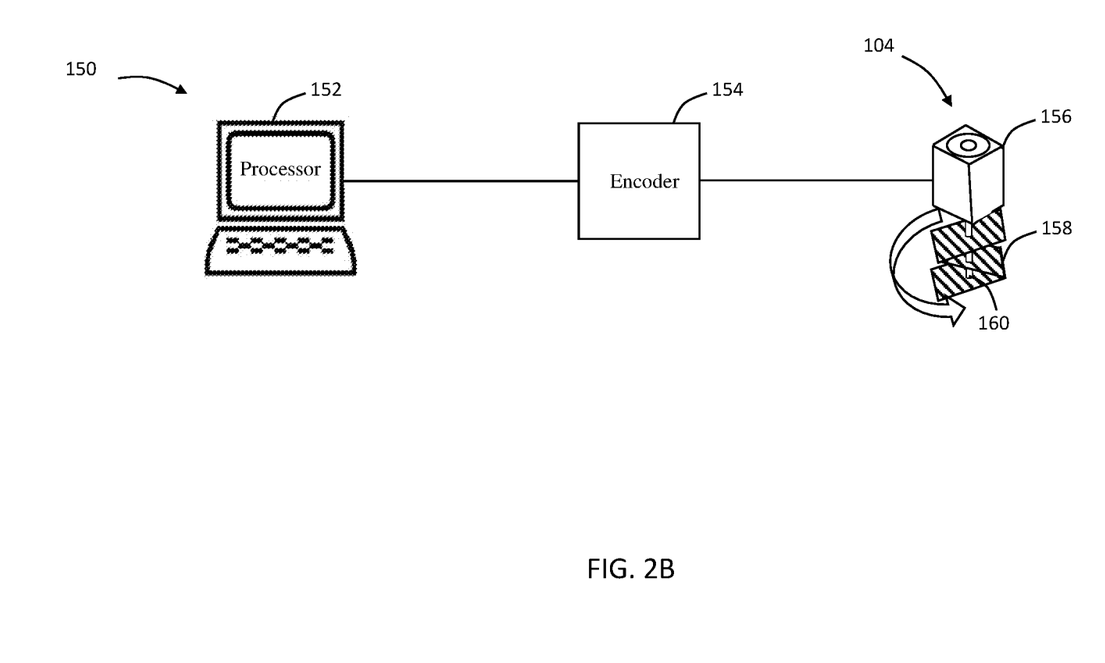
FIG. 2B is an exemplary schematic of the motor assembly of FIG. 2A.

Referring to FIG. 2A, a novel electromagnetic system 100 according to the present disclosure is shown. In FIG. 2A, the system 100 includes a chamber 102 which according to an embodiment is a metallic Faraday chamber, however, other electromagnetically limiting chambers are within the scope of the present disclosure. Within the chamber 102 there exists a motor assembly 104, and an alternating frequency power transmitter 106. The motor assembly 104 is shown in FIG. 2B, as part of a subsystem 150. The motor assembly 104 includes a motor 156, a stirrer 158 driven by a shaft 160. While the motor assembly 104 is shown inside the chamber 102, the motor 156 can be placed outside of the chamber 102 with the stirrer 158 placed inside the chamber 102. The stirrer 158 is shown as being positioned in one corner of the chamber 102, however, other positions are also within the scope of the present disclosure. Only one stirrer 158 is used in this embodiment, however, multiple stirrers and/or motors are within the scope of the present disclosure. As shown in FIG. 2B, the motor assembly 104 is coupled to an encoder 154, which coupled to a processor 152. Continuous rotating of the stirrer, according to one embodiment, continuously changes the electric and magnetic fields structures to thereby vary statistical electromagnetic environment inside the chamber, in order to simulate a rich multipath electromagnetic environment.

According to another embodiment, the electric and magnetic fields within the chamber are continuously changed by electronic stirring, in which the frequency of the alternating transmitted power is continuously changed. For example, the frequency is continuously changed a predetermined bandwidth about a selected frequency $f_0$, as discussed further below. Alternatively, the electric and magnetic fields are continuously changed by continuously changing amplitude of the applied alternating wireless power by a predetermined amplitude.

Next, with reference back to FIG. 1, one or more positions within the chamber are identified in order to determine the proper frequency range of transmission, as shown in block 18. These locations correspond to locations of temperature sensors to be powered by the wireless power transmission. Next, a matrix is generated based on the positions $180_i$ (see FIG. 2A) and the frequency of the alternating transmitted power as it is varied by selection from the plurality of predetermined plurality of frequencies, as shown in block 20. For example, suppose 10 positions have been selected, the number of electromagnetic structures is 360 corresponding to the mechanical paddle having 360 discrete rotational positions, and each electromagnetic structure is recorded at 1000 frequencies, the matrix will have 3600 rows and 1000 columns, correspondingly. Next the matrix is applied to a statistical function, as shown in block 22. In one example, the statistical function can be an exponential function. For example, the exponential function can be expressed as:

$$f_{x_2^2}(x)=(1/2\sigma^2)\exp(-x/2\sigma^2)U(x), \text{ wherein}$$

$f_{x_2^2}$ is a Chi-Squared distribution function with two degrees of freedom,

σ is the standard deviation of the parent normal distribution (any Chi-squared distribution is composed of the sum of squared 'n' normal distributions, where 'n' is the degree of freedom of the resulting Chi-Squared distribution—these normal distributions are referred to as parent normal distribution), and x is the received power.

Figure 3:
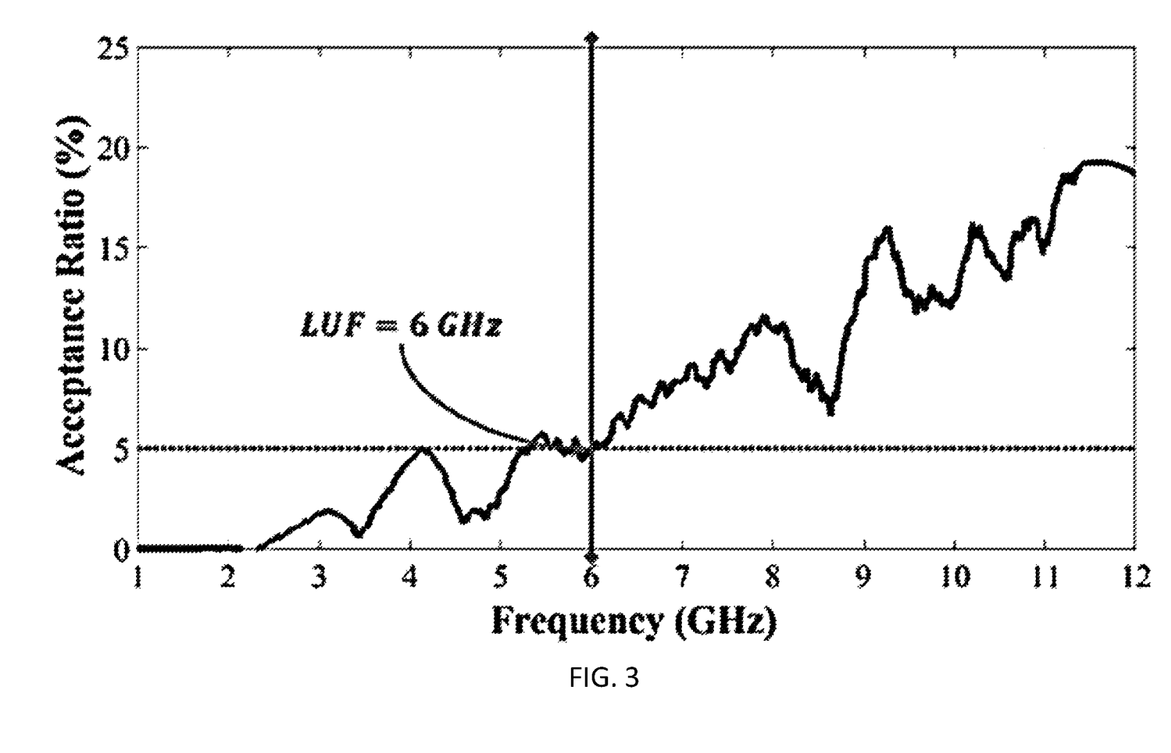
FIG. 3 is an example graph of acceptance ratio (which is a measure of fit quality of the statistical function) vs. frequency in GHz, showing a lowest usable frequency (LUF) according to a predetermined threshold.

Upon application of the above-described matrix to the statistical function, a graph is thus generated describing acceptance ratio percentage (which is a measure of fit quality of the statistical function) vs. frequency. An example of this graph is shown in FIG. 3. Next in method of FIG. 1, is the step of determining where the graph crosses a predetermined threshold for acceptance ration % (in the graph of FIG. 3, this threshold was equated to 5%), as provided in block 24; a lowest usable frequency (LUF) is thus identified. In FIG. 3, the LUF is about 6 GHz.

Generally, higher frequencies yield better statistical properties. At the LUF, there is enough electromagnetic modes (i.e., simultaneously coexisting electromagnetic structures) in the chamber to generate a statistical electromagnetic environment. However, using the LUF is not necessarily sufficient for creating an acceptable statistical electromagnetic environment. A range of frequencies, $f_0$, greater than LUF valid for this purpose should be determined, as provided in block 26. An example of these tests is the chamber quality factor test and the average to minimum received power test.

Next, a threshold for a measure of losses ($Q_{thr}$) around LUF is determined, as provided in block 28. The $Q_{thr}$ is calculated based on:

$$Q_{thr} = \left(\frac{4\pi}{3}\right)^{\frac{2}{3}} \frac{3V^{\frac{1}{3}}}{2\lambda},$$

wherein V is the volume of the chamber, and

λ is wavelength of the alternating power, where λ is calculated based on:

λ=$c_0/f_0$, where $c_0$ is the speed of light.

Figure 4:
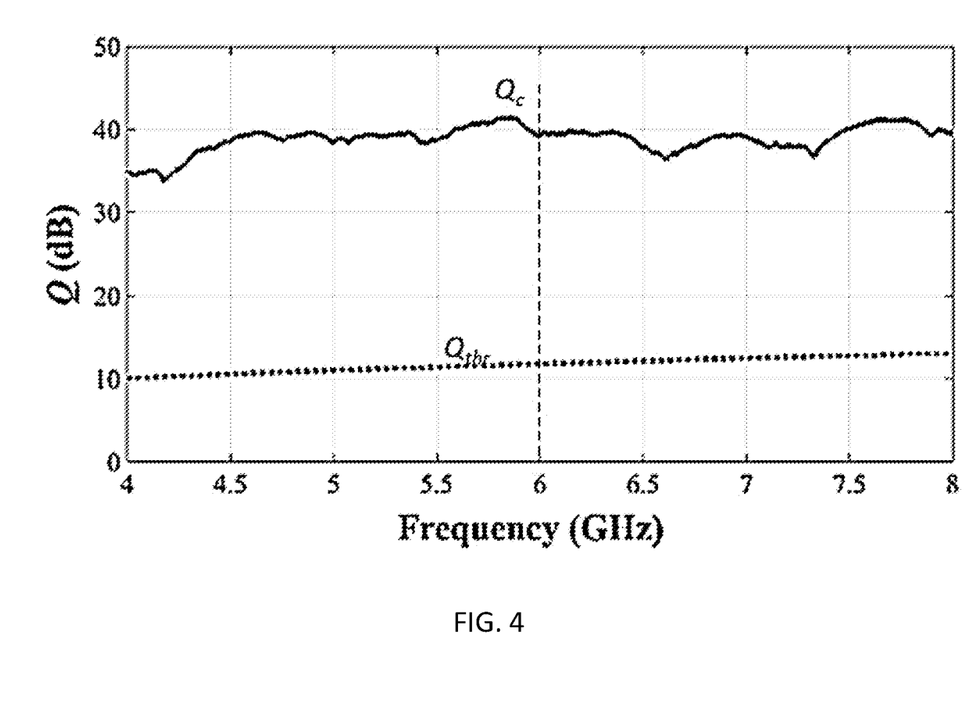
FIG. 4 is a graph of threshold for a measure of losses (Qthr) and actual losses (Qc) vs. frequency.

Next, actual losses ($Q_c$) of the chamber is measured at frequency $f_0$ (the initial value for $f_0$ is the LUF), as shown in block 30 on the second page of FIG. 1. The losses are the result of i) Joules-heat owing to imperfect conductive walls generating currents that turn into heat, or ii) dielectric losses which also turn into losses generating heat. The losses in the chamber $Q_c$ is determined according to one embodiment by i) measuring a power delay profile (PDP) at a frequency $f_0$; ii) plotting the PDP on a dB scale; iii) fitting the PDP curve to a linear function; iv) determining slope of the linear function forming a time constant ($\tau_1$) of the chamber at the frequency $f_0$; v) calculating $Q_c$ as $2\pi f_0 \tau_1$; and vi) repeating steps (i) through (v) for different frequencies $f_0$. A graph of $Q_{thr}$ and $Q_c$ is shown in FIG. 4. At 6 GHz the measured $Q_c$ is about 40 dB. Next $Q_{thr}$ and $Q_c$ are compared, as provided in block 32. If $Q_c>>Q_{thr}$, as provided in the decision block 32, then the method proceeds to the next step as shown in block 38, otherwise, the method increments $f_0$, as provided in block 36, and returns to step BB, i.e., block 26, (where the new incremented frequency $f_0$ is chosen as compared to the previous value of $f_0$).

If the $Q_c>>Q_{thr}$, then the method proceeds to measuring the average and minimum power at the plurality of positions for frequencies greater than or equal to LUF, as provided in the block 38. Once the average and minimum power are measured, then a method of the present disclosure proceeds to calculating the ratio of the average received power to the minimum received power ($P_{Ravage-to-min}$), as shown in block 40. Next the method 10 compares the calculated $P_{Ravage-to-min}$ to a predetermined average to minimum power ratio ($ATMPR_{thr}$), as provided in block 42, where $ATMPR_{thr}$ is calculated based on:

$$ATMPR_{thr}[dB]=10 \log_{10}(N)+2.5, \text{ where}$$

Figure 5:
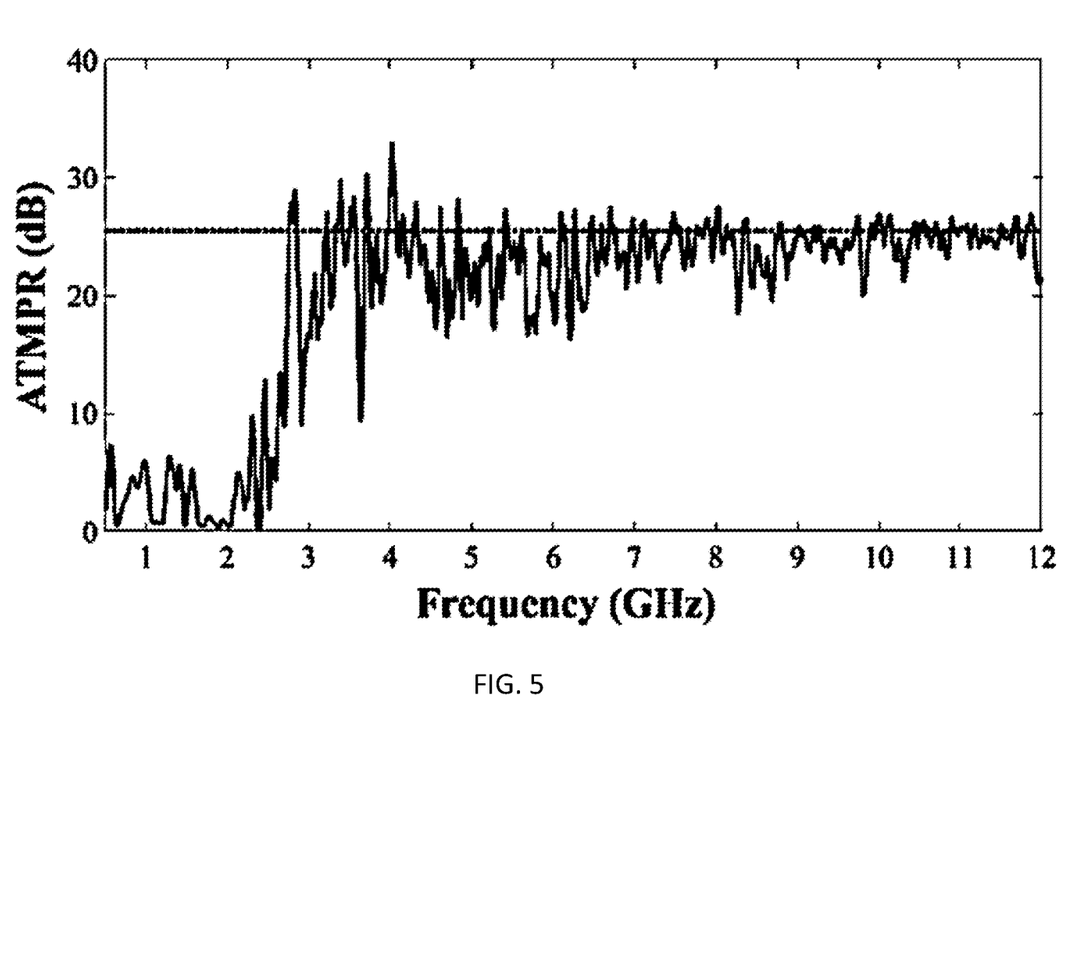
FIG. 5 is an example graph comparing actual power measurements expressed as $P_{Ravage\text{-}to\text{-}min}$ to average to minimum power ration expressed as $ATMPR_{thr}$ vs. frequency.

N is the number of stirring points used while collecting data-sets. In this embodiment, N refers to the number of paddle steps (e.g., 360 as in the example provided above with respect to the number of positions of the mechanical paddle). An example of a graph comparing actual power measurements expressed as $P_{Ravage-to-min}$ to $ATMPR_{thr}$ is shown in FIG. 5. The measured ATMPR swings about the predetermined $ATMPR_{thr}$ discussed above. Smaller swing about this value implies better statistical properties. If, at the last selected value of $f_0$, the swing range is small, based on a decision block 44, then this value of $f_0$ is accepted as the WPT frequency. Otherwise, the method according to the present disclosure returns to choosing a new $f_0$ and thereby repeating the steps forward of choosing a new $f_0$, as shown in the decision block 44.

A system comprising more than a general purpose computer can be used to assemble the data for the above-described steps. According to one embodiment, this system may contain accessories including i) a sampling probe to measure the field anywhere within the chamber; ii) an amplifier to control the input power; iii) a signal generator to generate the desired frequency and to vary the driving frequency (in case electronic stirring by changing frequency is employed); iv) a noise generator to change the driving signal amplitude (in case electronic stirring by changing amplitude is employed); v) a paddle with rotation mechanism (in case mechanical stirring is employed); and a code implementation for the postprocessing of the data-sets.

Figure 6:
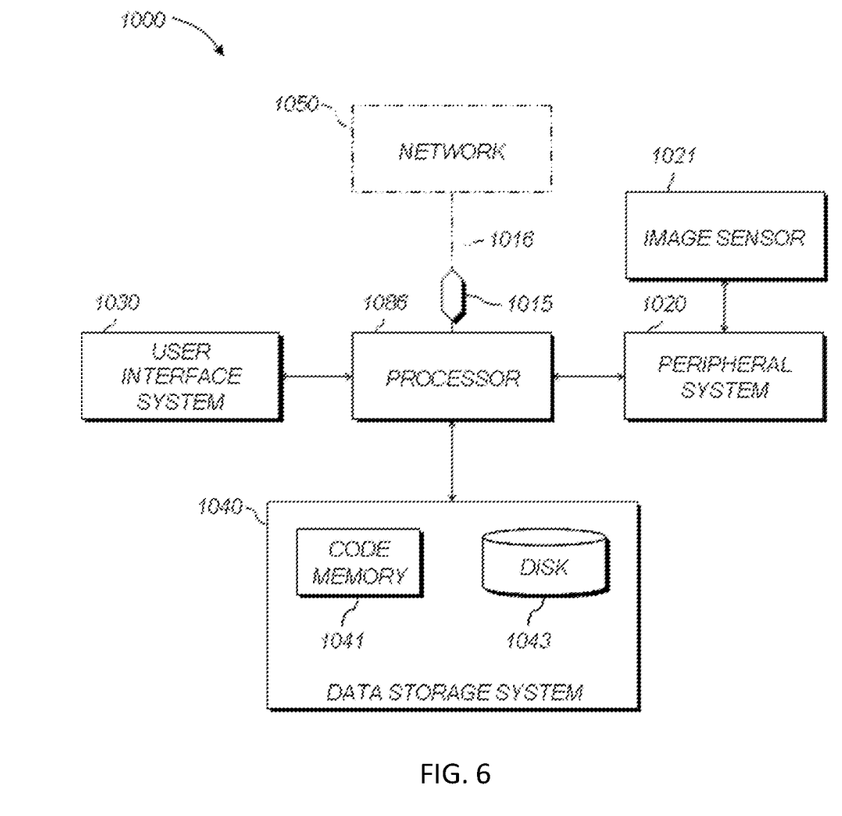
FIG. 6 is an example of a computer system that can interface with the uniform wireless power distribution system of the present disclosure.

Referring to FIG. 6, an example of a computer system is provided that can interface with the above-discussed uniform wireless power distribution system. Referring to FIG. 6, a high-level diagram showing the components of an exemplary data-processing system 1000 for analyzing data and performing other analyses described herein, and related components. The system includes a processor 1086, a peripheral system 1020, a user interface system 1030, and a data storage system 1040. The peripheral system 1020, the user interface system 1030 and the data storage system 1040 are communicatively connected to the processor 1086. Processor 1086 can be communicatively connected to network 1050 (shown in phantom), e.g., the Internet or a leased line, as discussed below. The imaging described in the present disclosure may be obtained using imaging sensors 1021 and/or displayed using display units (included in user interface system 1030) which can each include one or more of systems 1086, 1020, 1030, 1040, and can each connect to one or more network(s) 1050. Processor 1086, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 1086 can implement processes of various aspects described herein. Processor 1086 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. Processor 1086 can include Harvard-architecture components, modified-Harvard-architecture components, or Von-Neumann-architecture components.

The phrase "communicatively connected" includes any type of connection, wired or wireless, for communicating data between devices or processors. These devices or processors can be located in physical proximity or not. For example, subsystems such as peripheral system 1020, user interface system 1030, and data storage system 1040 are shown separately from the data processing system 1086 but can be stored completely or partially within the data processing system 1086.

The peripheral system 1020 can include one or more devices configured to provide digital content records to the processor 1086. For example, the peripheral system 1020 can include digital still cameras, digital video cameras, cellular phones, or other data processors. The processor 1086, upon receipt of digital content records from a device in the peripheral system 1020, can store such digital content records in the data storage system 1040.

The user interface system 1030 can include a mouse, a keyboard, another computer (connected, e.g., via a network or a null-modem cable), or any device or combination of devices from which data is input to the processor 1086. The user interface system 1030 also can include a display device, a processor-accessible memory, or any device or combination of devices to which data is output by the processor 1086. The user interface system 1030 and the data storage system 1040 can share a processor-accessible memory.

In various aspects, processor 1086 includes or is connected to communication interface 1015 that is coupled via network link 1016 (shown in phantom) to network 1050. For example, communication interface 1015 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 1015 sends and receives electrical, electromagnetic or optical signals that carry digital or analog data streams representing various types of information across network link 1016 to network 1050. Network link 1016 can be connected to network 1050 via a switch, gateway, hub, router, or other networking device.

Processor 1086 can send messages and receive data, including program code, through network 1050, network link 1016 and communication interface 1015. For example, a server can store requested code for an application program (e.g., a JAVA applet) on a tangible non-volatile computer-readable medium to which it is connected. The server can retrieve the code from the medium and transmit it through network 1050 to communication interface 1015. The received code can be executed by processor 1086 as it is received, or stored in data storage system 1040 for later execution.

Data storage system 1040 can include or be communicatively connected with one or more processor-accessible memories configured to store information. The memories can be, e.g., within a chassis or as parts of a distributed system. The phrase "processor-accessible memory" is intended to include any data storage device to or from which processor 1086 can transfer data (using appropriate components of peripheral system 1020), whether volatile or nonvolatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 1040 can be a tangible non-transitory computer-readable storage medium, i.e., a non-transitory device or article of manufacture that participates in storing instructions that can be provided to processor 1086 for execution.

In an example, data storage system 1040 includes code memory 1041, e.g., a RAM, and disk 1043, e.g., a tangible computer-readable rotational storage device such as a hard drive. Computer program instructions are read into code memory 1041 from disk 1043. Processor 1086 then executes one or more sequences of the computer program instructions loaded into code memory 1041, as a result performing process steps described herein. In this way, processor 1086 carries out a computer implemented process. For example, steps of methods described herein, blocks of the flowchart illustrations or block diagrams herein, and combinations of those, can be implemented by computer program instructions. Code memory 1041 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 1086 (and possibly also other processors), to cause functions, acts, or operational steps of various aspects herein to be performed by the processor 1086 (or other processors). Computer program code for carrying out operations for various aspects described herein may be written in any combination of one or more programming language(s), and can be loaded from disk 1043 into code memory 1041 for execution. The program code may execute, e.g., entirely on processor 1086, partly on processor 1086 and partly on a remote computer connected to network 1050, or entirely on the remote computer.

Those having ordinary skill in the art will recognize that numerous modifications can be made to the specific implementations described above. The implementations should not be limited to the particular limitations described. Other implementations may be possible.

The invention claimed is:

1. A method of uniform wireless power distribution within a chamber, comprising:
   a. measuring dimensional characteristics of a chamber, having a transmitter and a plurality of power harvesters;
   b. creating a statistical electromagnetic environment by stirring electromagnetic waves generated by an electromagnetic source inside the chamber;
   c. evaluating statistical properties of the statistical electromagnetic environment;
   d. setting a new criterion for acceptable statistical properties of the statistical electromagnetic environment;
   e. measuring a lowest usable frequency of the chamber below which the statistical properties of the statistical electromagnetic environment are not acceptable according to a predetermined criterion;
   f. determining an efficiency profile of the plurality of power harvesters versus frequency at frequencies higher than the lowest usable frequency;
   g. selecting an operating frequency that maximizes efficiencies of the plurality of power harvesters;
   h. measuring a collective efficiency of the chamber;
   i. returning to step d if the measured collective efficiency is below a predetermined efficiency threshold.

2. The method of claim 1, wherein the measuring dimensional characteristics of the chamber is based on measuring volume, surface area, a largest dimension, and a smallest dimension of the chamber.

3. The method of claim 1, wherein the creating the statistical electromagnetic environment includes placing the electromagnetic source inside the chamber.

4. The method of claim 1, wherein the creating the statistical electromagnetic environment includes placing the electromagnetic source outside the chamber.

5. The method of claim 1, wherein the creating the statistical electromagnetic environment includes continuously changing the electric and magnetic fields within the chamber.

6. The method of claim 5, wherein the continuously changing includes stirring the electric and magnetic fields.

7. The method of claim 6, wherein the stirring includes mechanical stirring.

8. The method of claim 7, the mechanical stirring includes a mechanical paddle continuously moving inside the chamber.

9. The method of claim 8, wherein the moving of the mechanical paddle includes rotating.

10. The method of claim 6, wherein the stirring can be achieved by electronic stirring.

11. The method of claim 10, frequency of the transmitter is continuously changed.

12. The method of claim 1, wherein the evaluating statistical properties of the statistical electromagnetic environment includes estimating the statistical properties by a chamber quality factor.

13. The method of claim 1, wherein the evaluating statistical properties of the statistical electromagnetic environment includes estimating a statistical test on one or more electromagnetic parameters.

14. The method of claim 1, wherein the evaluating statistical properties of the statistical electromagnetic environment includes estimating average to minimum power ratios obtained from a plurality of samples of received powers at a plurality of locations and at a plurality of times.

15. The method of claim 1, wherein the selecting an operating frequency that maximizes efficiencies of the plurality of power harvesters is based on i) selecting one or more identical power harvesters of the plurality of power harvesters; and ii) determining a frequency at which the efficiency is maximum for all the plurality of power harvesters based on the selected power harvesters.

16. The method of claim 1, wherein the collective efficiency includes the ratio of total harvested power from the one or more power harvesters to total input electromagnetic power injected inside the chamber.

17. The method of claim 16, wherein the selecting an operating frequency that maximizes efficiencies of the plurality of power harvesters is based on i) selecting one or more different power harvesters of the plurality of power harvesters; and ii) determining a frequency at which the efficiency is maximum for all the plurality of power harvesters based on the selected power harvesters.

* * * * *